US005974973A

United States Patent [19]

Tittgemeyer

[11] Patent Number: 5,974,973

[45] Date of Patent: Nov. 2, 1999

[54] BASE CARRIER SLEEVE FOR ROTARY PRINTING MACHINES

[75] Inventor: Udo Tittgemeyer, Arnsberg, Germany

[73] Assignee: Heidelberger Druckmaschinen AG, Heidelberg, Germany

[21] Appl. No.: 09/071,517

[22] Filed: May 1, 1998

[30] Foreign Application Priority Data

May 16, 1997 [DE] Germany ........................... 197 20 551

[51] Int. Cl.[6] .............................. B41F 30/00; F16L 11/16

[52] U.S. Cl. ......................... 101/375; 101/401.1; 492/44; 138/143; 138/144

[58] Field of Search .................................... 101/217, 375, 101/376, 401.1; 492/18, 35, 43, 44, 48, 51, 52, 56; 29/895.211, 895.23; 138/129, 130, 132, 134, 144, 143, 150, 154

[56] References Cited

U.S. PATENT DOCUMENTS

| | | | |
|---|---|---|---|
| 285,576 | 9/1883 | Coas | 138/142 |
| 3,146,709 | 9/1964 | Bass et al. | 101/401.1 |
| 3,367,816 | 2/1968 | Mills et al. | 156/190 |
| 3,677,856 | 7/1972 | MacCallum et al. | 156/187 |
| 3,978,254 | 8/1976 | Hoexter et al. | 101/375 |
| 5,131,325 | 7/1992 | Blauvelt | 101/375 |
| 5,301,610 | 4/1994 | McConnell | 101/401.1 |
| 5,316,798 | 5/1994 | Tittgemeyer | 492/48 |
| 5,324,248 | 6/1994 | Quigley | 492/52 |
| 5,347,927 | 9/1994 | Berna et al. | 101/375 |
| 5,352,507 | 10/1994 | Bresson et al. | 428/909 |
| 5,379,693 | 1/1995 | Hoffmann et al. | 101/375 |
| 5,429,048 | 7/1995 | Gaffney et al. | 101/217 |
| 5,488,903 | 2/1996 | Köbler et al. | 101/375 |

FOREIGN PATENT DOCUMENTS

| | | |
|---|---|---|
| 0 421 145 | 4/1991 | European Pat. Off. . |
| 0 613 791 | 9/1994 | European Pat. Off. . |
| 635 187 | 8/1936 | Germany . |
| 39 08 999 | 3/1993 | Germany . |
| 41 40 768 | 8/1994 | Germany . |
| 43 15 996 | 8/1994 | Germany . |
| 42 30 431 | 9/1996 | Germany . |
| WO 94/25284 | 11/1994 | WIPO . |

*Primary Examiner*—Stephen R. Funk
*Attorney, Agent, or Firm*—Kenyon & Kenyon

[57] ABSTRACT

A tubular body which can be applied to a cylindrical carrier body and removed from it again, being characterized in that a first layer (10) of a wound narrow strip material (6) with a first pitch (12) is covered by another material.

19 Claims, 5 Drawing Sheets

BASE CARRIER SLEEVE FOR ROTARY PRINTING MACHINES

FIELD OF THE INVENTION

The present invention relates to a base carrier tube for rotary printing machines, serving as carriers for the elastic coating on the impression cylinder in gravure printing, accommodating the stick-on printing blocks in flexographic printing and elastic coatings in offset printing methods as replaceable transfer carrier tubes.

RELATED TECHNOLOGY

German Patent DE 39 08 999 C2 discloses a replaceable tube on which a compressible coating is provided. The tube comprises a carrier tube made of plastic which may be reinforced with carbon fibers or may be a metal tube made of aluminum, for example. The wall thickness is between 0.2 and 3.0 mm, depending on the material.

The much lower modulus of elasticity when plastic tubes are used as the carrier tubes for coatings leads to a greater wall thickness of these tubes to achieve adequate seating strength on the printing cylinders. When elastomers are applied to the plastic tubes—e.g., as rubber blanket coverings—they must be vulcanized in the manufacturing process. Therefore the base cylinder of steel together with the base tube of plastic provided with the elastomer coating must be exposed during production to a temperature up to 200° C. for approximately one hour during the vulcanization phase. This results in loss of dimensional stability of the plastic tube and to internal stresses in the overall structure.

This thermal sensitivity of the plastic tubes makes it difficult to produce them with the required precision. In addition, the insulating nature of plastics must be classified as critical with regard to electrical and electrostatic charge buildup in high-speed rotary printing machines. Not least of all, the greater wall thicknesses required because of the low elastic modules cause a not insignificant increase in cost of the plastic tubes.

European Patent 421,145 A1 discloses a lithographic printing machine where a tubular rubber blanket which has a gap-free outside surface is removably applied to a rubber blanket cylinder.

The base layer with the tubular rubber blanket disclosed in European Patent 421,145 A1 is made of nickel. The nickel tube as the base carrier tube for elastic coatings is produced by electroplating. A parent cylinder produced accurately in the required dimensions is immersed in an electroplating nickel bath, so that nickel is deposited from the electrolyte on the carrier cylinder. The thin nickel membrane accurately models the entire geometry of the cylinder surface, so that the accuracies of the cylinder base can be transferred to the nickel tube. The electroplating manufacturing process causes a high level of environmental pollution, is very time-consuming and also requires very high power consumption. Since it is conventional with the current manufacturing processes to remove the nickel membrane from the parent cylinder by means of a roll, the material consequently undergoes severe deformation and stretching. This procedure has a very negative effect on dimensional accuracy.

The nickel tubes produced by the electroplating method have a wall thickness between 0.1 and 0.3 mm and are therefore very susceptible to buckling, which makes handling very delicate. An increase in the wall thickness in the deposition process would result in a great increase in the cost of the nickel tubes and would also make it even more difficult to remove them from the parent cylinder.

German Patents DE 41 40 768 C2 and DE 43 15 996 C1 disclose offset printing forms where the facing edges of the plate, which has been bent into a hollow cylindrical shape, are joined by means of a weld. The welding process should be carried out in such a way as to yield a weld having a concave shape on the upper and lower sides.

This technique of welding the plate ends is based on the fact that a finite plate is used. It is difficult to cut the flat length of the sheet metal, which will later form the casing of the tube, so that it is exactly parallel and has the required accuracy of much better than 0.1 mm. In addition, due to the heat input in welding, longitudinal distortion of the material in the area of the weld is almost unavoidable. In using tubes produced in this way this elongation necessarily results in air inclusions which develop with this waviness of the seam and are distributed under the tube when external pressure is applied to the tube or migrate under the tube with rotation, which leads to warping of the tube.

An acceptable cylindrical shape cannot be achieved with whole-format sheet metal bending. A subsequent calibration of the tube to achieve dimensional accuracy of the tube is indispensable as an additional operation. The resulting material stresses are extremely high and arc extremely difficult to control.

SUMMARY OF THE INVENTION

Starting from the weaknesses and disadvantages of the aforementioned related art, an object of this invention is to make available to the graphics industry inexpensive base carrier tubes that are optimized for strength and rigidity for manufacturing transfer carriers, printing forms, impression cylinders, etc.

This object is achieved by providing a tubular body which can be applied to a cylindrical carrier body and can be removed from it again, characterized in that a first layer (10) of a wound narrow strip material (6) is covered by another material with a first pitch (12).

The design according to the present invention yields an enormous improvement in the rigidity of base carrier tubes while retaining extremely thin walls of such tubes. The narrow strip material used—a very thin metal foil—has a very high thermal stability; furthermore, the narrow strip material used is very inexpensive and permits inexpensive production of the base carrier tubes in an industrially automatable manufacturing process. Use of the sandwich construction for the base carrier tubes leads to excellent strength and rigidity properties combined with a low weight of the base carrier tubes, which are beneficial properties for the graphics industry.

In another embodiment of the basic idea of the present invention, an adhesive layer is provided between the first layer and at least one other layer of a material. A function layer such as a compressible print covering like a rubber blanket may be provided as an additional material that can be applied to the wound first layer, or an additional layer of the narrow strip material may be provided. The function of the adhesive layer is to ensure the imperviousness of the tube and to maintain the mutual adhesion of the layers.

The additional layer may be arranged relative to the first layer of the narrow strip material in such a way that it has the pitch of the first layer but a different strip width from the first layer. As an alternative, the additional layer of the narrow strip material may be applied to the first layer of the narrow strip material with a pitch opposite the first pitch.

Finally, it is also possible to wind a strip having the same width as the underlying layer so that it is offset by half the width of the strip.

The narrow strip material is preferably a thin, thermally stable metal foil which is between 10 and 100 mm wide, preferably 40 mm wide. The thin metal strip may be between 0.05 mm thick and 0.15 mm thick, which guarantees easy processing. The winding angle at which the first layer and the at least one additional layer are applied is selected so that one strip width of the narrow strip material is applied per winding revolution.

Due to the arrangement of the adhesive layer between the first layer and the at least one additional layer of the narrow strip material in a sandwich structure, the stressed zones of the base carrier tube are shifted radially outward in an advantageous manner; since the adhesive of the adhesive layer has a much lower elastic modulus in comparison with the narrow strip material, the adhesive layer does not affect the elongation of the base carrier tube in applying it to or removing it from a printing cylinder. The thickness of the adhesive layer is preferably in the range between 0.01 mm and 0.1 mm. The adhesive layer of the base carrier tube according to the present invention prevents a relative movement between the first layer and the at least one additional layer of the narrow strip material; the adhesive layer is subjected only to shearing stress with elongation of the base carrier tube.

BRIEF DESCRIPTION OF THE DRAWINGS

The present invention will now be explained in detail on the basis of the drawings, in which.

DETAILED DESCRIPTION

Figure 1:
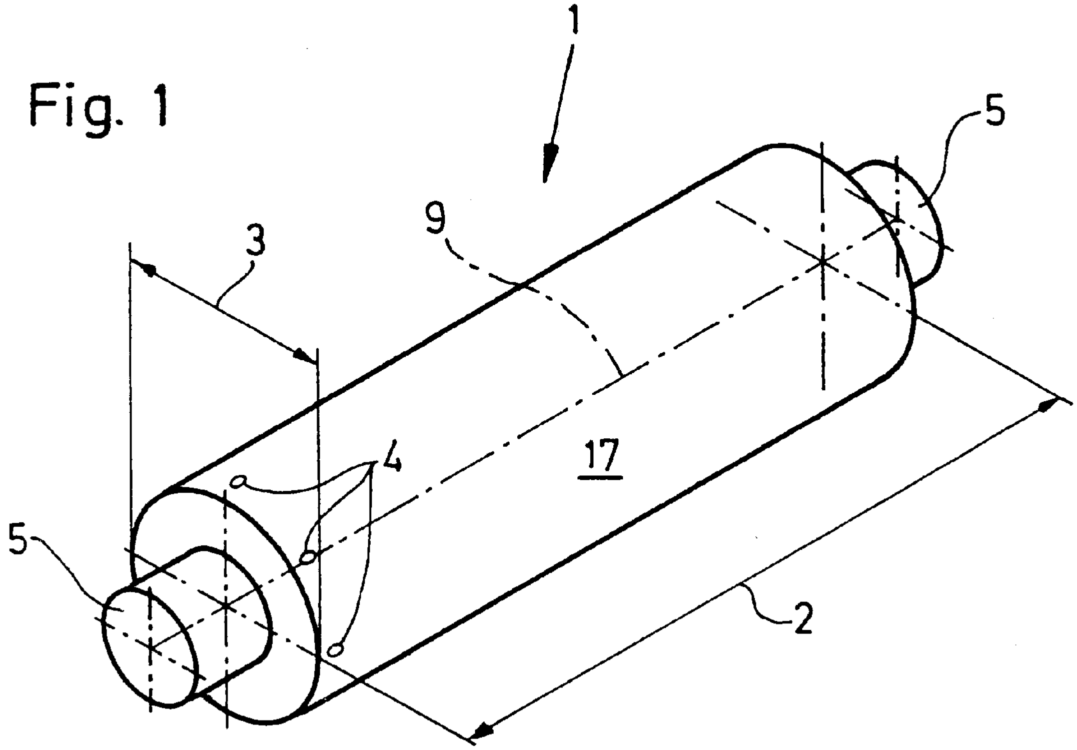
FIG. 1 shows a winding spindle provided with air holes for a base carrier tube according to the present invention.

FIG. 1 shows a winding spindle 1 provided with air holes for a base carrier tube according to the present invention. Spindle 1 has a width 2, rotates about its axis 9 and is held on pegs 5. To remove the base carrier tube from a surface 17 of spindle 1, air holes 4 are provided; with the help of said air holes, an air cushion is created beneath the base carrier tube. The inside diameter of the base carrier tube is determined by spindle diameter 3.

Figure 2:
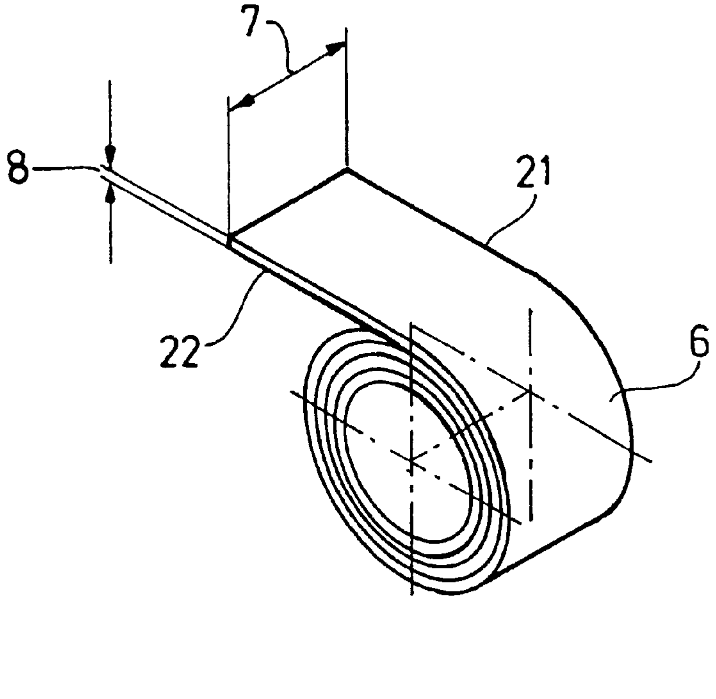
FIG. 2 shows a supply of the extremely narrow strip material.

FIG. 2 shows a supply of narrow strip material 6—an extremely thinly rolled metal foil. The width 7 of strip material 6 is between 10 mm and 100 mm, preferably approximately 40 mm. Strip material 6 has a thickness 8 of approximately 0.05 mm thick.

Figure 3:
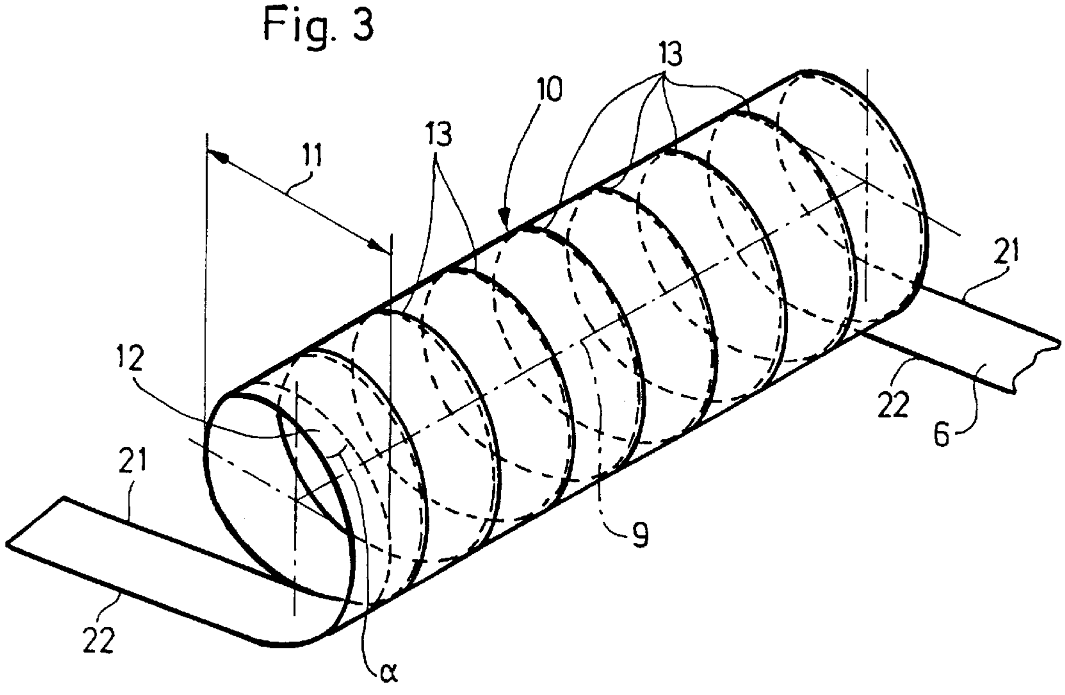
FIG. 3 shows a wound first layer of narrow strip material with a first pitch.

FIG. 3 shows the arrangement of the first layer of narrow strip material of a base carrier tube. Narrow strip material 6 is wound around spindle 1 in such a way as to form a first layer 10 of the base carrier tube. Narrow strip material 6 is arranged at an angle—oriented diagonally by the winding angle α—so that the individual windings of the first layer lie side by side without any overlap and without forming gaps. The respective edges 21, 22 of narrow strip material 6 form joints 13 where they abut against one another. The first layer of the base carrier tube according to the present invention thus comprises a first layer 10 of material which is supported by the surface of a winding spindle, is oriented slightly diagonally and extends over the entire width 2 of spindle 1. First layer 10 of thin strip material 6 has outside diameter 11.

The tube insert strip formed per winding revolution forms joints 13 with edges 21 of the preceding strip of narrow strip material 6. At these joints 13, edges 21, 22 of narrow strip material 6 abut against one another without forming a gap or overlapping. If there were a gap at joints 13, the base carrier tube would not have the desired rigidity. Furthermore, it would be difficult or impossible to create the air cushion necessary for assembly and disassembly. Overlapping of narrow strip material 6 at the respective joints 13 would destroy the required precision of the base carrier tube.

Figure 4:
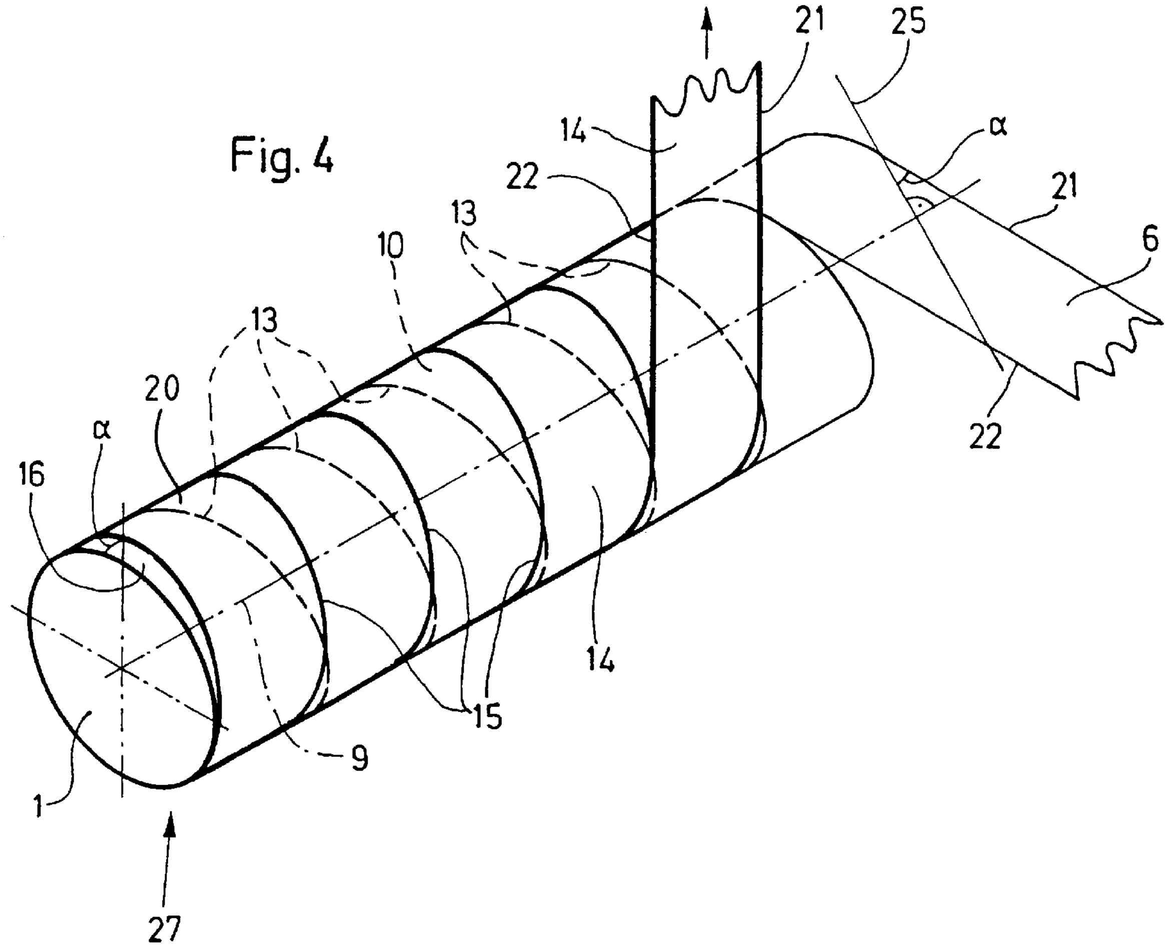
FIG. 4 shows another layer of narrow strip material covering a first layer of narrow strip material.

FIG. 4 shows the base carrier tube in a state in which another layer 14 of narrow strip material 6 is applied to the first layer 10 of narrow strip material 6.

The first layer 10 of narrow strip material 6, which forms the base or base layer of base carrier tube is oriented perpendicular to normal 25 to axis 9 with a first winding angle α. Edges 21, 22 form joints 13 with one another. Another layer 14 of narrow strip material 6 is applied over an adhesive layer 18 (not shown in FIG. 4). The at least one additional layer 14 of narrow strip material 6 is oriented by a winding angle α—opposite to the direction of winding of the first layer 10. The at least one additional layer 14 with a pitch 16 opposite pitch 12 of the first layer 10 also has joints 15 where edges 21, 22 of narrow strip material 6 abut against one another. Adhesive layer 18 applied between the first layer 10 and at least one additional layer 14 causes an additional stiffening of the base carrier tube (see also FIG. 6). Adhesive layer 18 is not shown in FIG. 4, however. Joints 13 and 15 of the respective layers 10 and 14 overlap one another crosswise, depending on the angle α of pitch. Supplementing the diagram in FIG. 3, FIG. 4 shows normal 25 to axis 9; the first layer 10 of narrow strip material 6 is applied with an inclination to this axis by the angle α.

Narrow strip material 6 is preferably an extremely thin rolled metal foil only a few hundredths of a millimeter thick, width 7 of narrow strip material 6 may be between 10 mm and 100 mm, e.g., 40 mm, which permits good processing.

The diagram in FIG. 4 shows a bidirectionally wound base carrier tube constructed as a composite body with a sandwich structure 20 having a great buckling strength. The condition for this is that joints 13 and 15 must be free of gaps in both the first layer 10 and additional layer 14, and edges 21, 22 of narrow strip material 6 must abut against one another at joints 13 and 15 and must not overlap.

Figure 5:
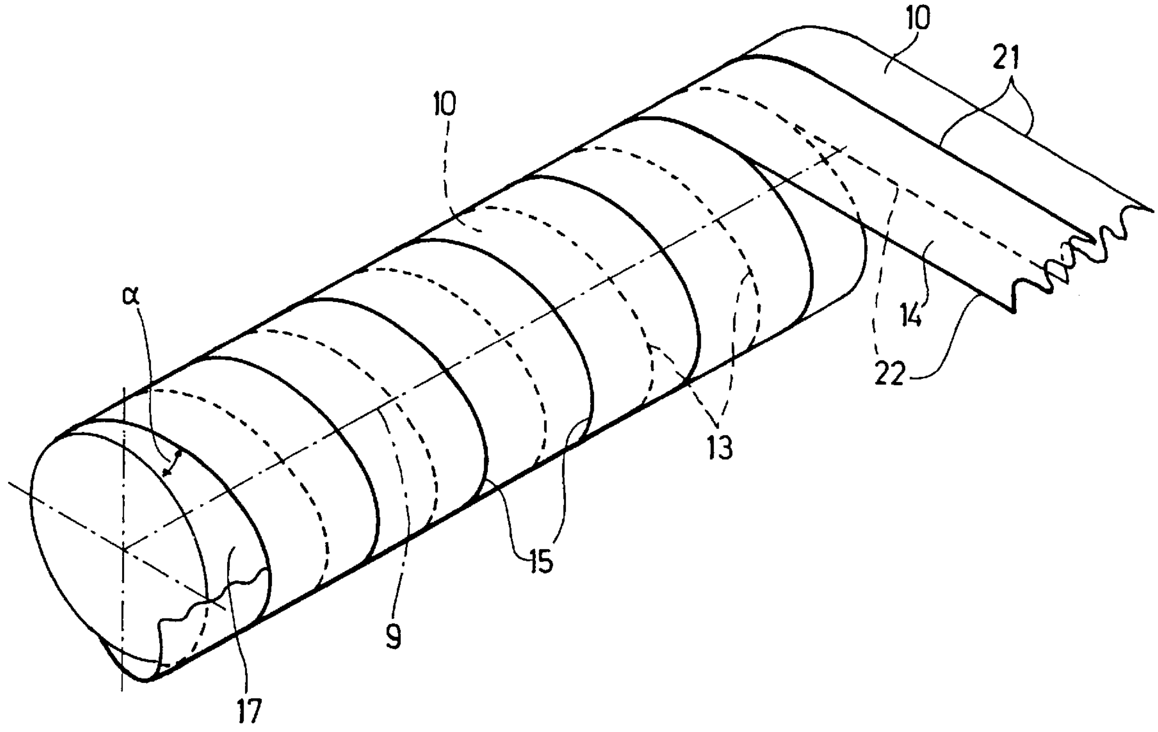
FIG. 5 shows a strip of the same width as an additional layer wound over a layer beneath it, offset by half the width of the strip material.

To illustrate the simplest case in FIG. 5, a strip of the same width may be wound with an offset by half the width of the strip. First, the first layer 10 is wound onto spindle surface 17 with an angle of pitch α; edges 21, 22 of strip material 6 form joints 13. The additional layer 14 of narrow strip material 6 which is then wound is offset to the first layer 10 here by half the width, for example. Joints 15 which are formed by winding are not located over joints 13 of the first layer 10 but instead are offset by half the width of a strip. This makes a great contribution toward improving the buckling strength of a tube or sleeve according to the present invention.

Figure 6:
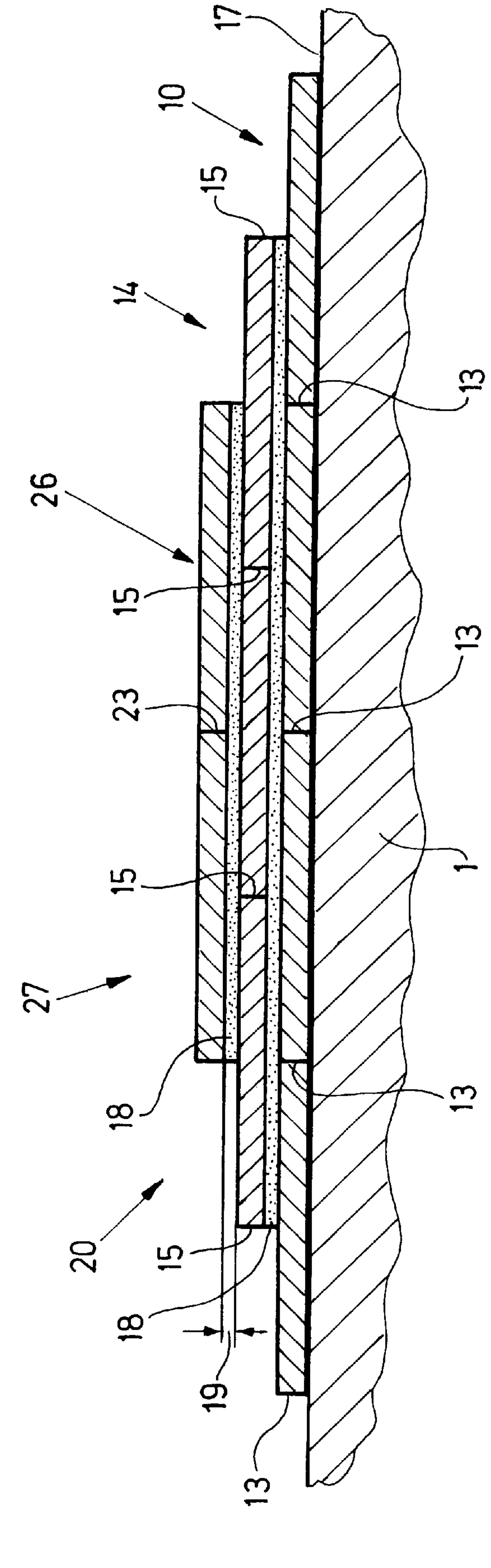
FIG. 6 shows a cross section through the sandwich structure of a base carrier tube on a winding spindle.

FIG. 6 shows a base carrier tube on surface 17 of spindle 1. Base carrier tube 27 comprises a first layer 10, as already shown in FIG. 3. Edges 21, 22 of narrow strip material 6 abut against one another at joints 13 of the first layer without forming gaps and without any overlapping. The precision with which joints 13 are formed affects the subsequent precision of base carrier tube 27 and permits the development of the air cushion required for assembly and disassembly when applied to the respective printing cylinder. An adhesive layer 18 is shown over the first layer 10 of narrow strip material 6. Adhesive layer 18 has the function of preventing displacement of the individual layers 10 and 14 relative to one another while also ensuring a sealing of individual joints 13 of the first layer 10. Adhesive layer 18 is made as thin as possible, e.g., in the range of 0.07 mm, to absorb shearing forces or shearing stresses that may occur. Adhesive layer 18 may be any of various types of adhesives or combinations of adhesives. For example, adhesive layer 18 may preferably include anaerobic adhesives, or sandwich-forming epoxy systems.

Another layer of narrow strip material 6 is shown above adhesive layer 18. According to the diagram in FIG. 4, this at least one additional layer 14 is applied with a pitch 16 opposite the pitch 12 of the first layer 10. Due to this opposite pitch 16, joints 15 of the at least one additional layer 14 are above joints 13 of the first layer 10. The first layer 10, adhesive layer 18 and the minimum of one additional layer 14 form a sandwich structure 20 of base carrier tube 27 as a material composite.

The covering of joints 13 and 15 of layers 10 and 14, respectively, within the wound material composite imparts a high buckling strength with a much greater stiffness to base carrier tube 27, which is created with sandwich structure 20. In addition to a two-layer structure of base carrier tube 27, it may also comprise additional layers (a third layer 26 is shown here), as shown in FIG. 6 as an example. Third layer 26 is also applied by means of an adhesive layer 18 with thickness 19 to additional layer 14. Joints 23 of narrow strip material 6 of third layer 26 are arranged so they do not lie above joints 15 of additional layer 14. This can be achieved, for example, by changing width 7 of narrow strip material 6 or by changing the winding angle $\alpha$, i.e., the winding pitch.

In preferred embodiments, the following strip is always wound with an offset by a portion of strip width 7 in comparison with the respective previous layer with the same strip width of all layers 10. 14 or 26. The offset depends on the number of layers. Thus, depending on the number of layers, the offset amounts to half of strip width 7 when there are two layers 10, 14, or one-third of strip width 7 when the winding has three layers 10, 14 and 26. The advantage of winding the respective layers 10, 14 and 26 with an offset by a portion of strip width 7 with a three-layer winding is that the joints do not intersect axially from one layer to the next, which greatly improves the surface of the tubes, especially their roundness.

Figure 7:
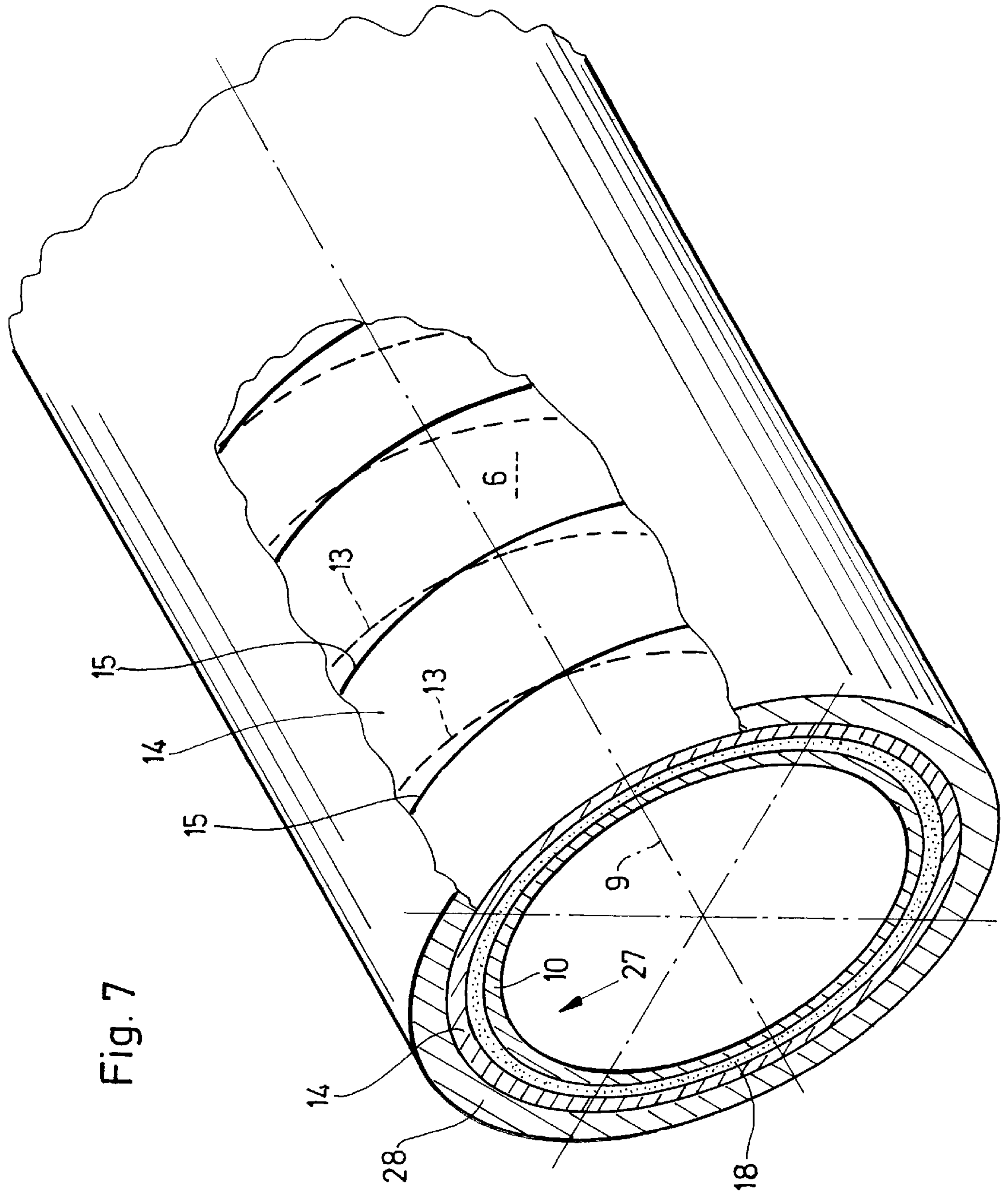
FIG. 7 shows a base carrier tube according to the present invention.

FIG. 7 shows a bidirectionally wound base carrier tube 27, which has an elastic covering 28, for example, such as that needed for the offset printing process. The present invention does not cover the design of the elastic covering or its layer sequence.

FIG. 7 shows the sequence of layers of base carrier tube 27 (not drawn to scale). The first layer 10 of narrow strip material 6 is arranged below additional layer 14, forming joints 13. Adhesive layer 18, which is provided between additional layer 14 and bottom layer 10, has a much lower modulus of elasticity in comparison with narrow strip material 6. Therefore, adhesive layer 18 does not affect the elongation of the first layer 10 and the at least one additional layer 14. However, since three layers 10, 14, 18 are arranged one above the other in a sandwich structure 20, this has a significant effect on the improved rigidity of base carrier tube 27.

Base carrier tube 27 may be acted upon by an air cushion through air holes which are provided on spindle 1 according to FIG. 1 and also on the printing cylinder of the rotation, to permit assembly and disassembly from spindle 1 or printing cylinder 1.

What is claimed is:

1. A carrier tube for a rotary printing machine, the carrier tube being capable of being applied to and removed from a cylindrical carrier, the carrier tube comprising:

a first layer of a first wound narrow strip material with a first pitch;

a second layer of a second wound narrow strip material covering the first layer; and an adhesive layer between the first layer and the second layer;

the first narrow strip material including a first thin metal foil and the second narrow strip material including a second thin metal foil, the first layer being wound without overlapping and without gaps.

2. The carrier tube as recited in claim 1 wherein the second wound narrow strip material covers joints of the first layer.

3. The carrier tube as recited in claim 1 wherein the second layer is applied so that the second wound strip material overlaps joints of the first layer.

4. The carrier tube as recited in claim 3 wherein the second layer is wound with the first pitch and wherein the second strip material has a different strip width from the first narrow strip material.

5. The carrier tube as recited in claim 3 wherein the second layer is wound onto the first layer of the narrow strip material with a pitch opposite the first pitch.

6. The carrier tube as recited in claim 3 further comprising a third layer including a third narrow strip material, and wherein at least one of the second strip material and the third strip material is wound with a width offset corresponding to a reciprocal of a number of layers to be wound on the carrier tube, the first narrow strip material, and at least one of the second narrow strip material and the third narrow strip material having the same strip width.

7. The carrier tube as recited in claim 1 wherein the adhesive layer includes anaerobic adhesives.

8. The carrier tube as recited in claim 1 wherein the adhesive layer includes an epoxy.

9. The carrier tube as recited in claim 1 wherein the first thin metal foil is a thermally stable thin metal foil.

10. The carrier tube as recited in claim 1 wherein the first narrow strip material is between 10 mm and 100 mm wide.

11. The carrier tube as recited in claim 1 wherein the first narrow strip material is 40 mm wide.

12. The carrier tube as recited in claim 1 wherein the first narrow strip material is between 0.05 mm and 0.2 mm thick.

13. The tubular body as recited in claim 1 wherein a winding angle $\alpha$ of the first narrow strip material is selected so that there is an advance by a strip width of the first narrow strip material per winding revolution.

14. The carrier tube as recited in claim 1 wherein the second layer is wound without overlapping and without gaps.

15. The carrier tube as recited in claim 1 wherein the first layer, the second layer and the adhesive layer form a sandwich structure and wherein the adhesive layer has a lower modulus of elasticity relative to a modulus of elasticity of the first narrow strip material, so as to cause stressed areas of the carrier tube to be displaced radially outward.

16. The carrier tube as recited in claim 1 wherein the adhesive layer forms a radial distance between the first layer and the second layer, the adhesive layer having a lower modulus of elasticity than the first narrow strip material.

17. The carrier tube as recited in claim 1 wherein a thickness of the adhesive layer is between 0.01 mm and 0.1 mm.

18. The carrier tube as recited in claim 1 wherein the adhesive layer prevents relative movement between the first layer and the second layer.

19. The carrier tube as recited in claim 1 further comprising at least one additional layer, the at least one additional layer being wound without overlapping and without gaps.

* * * * *